United States Patent [19]

Polizzotti et al.

[11] 4,384,968

[45] May 24, 1983

[54] ELECTROSTATIC PRECIPITATOR EFFICIENCY ENHANCEMENT

[75] Inventors: David M. Polizzotti, Yardley; Joe C. Steelhammer, Lansdale, both of Pa.

[73] Assignee: Betz Laboratories, Inc., Trevose, Pa.

[21] Appl. No.: 271,747

[22] Filed: Jun. 8, 1981

Related U.S. Application Data

[60] Division of Ser. No. 207,173, Nov. 17, 1980, Pat. No. 4,294,588, which is a continuation-in-part of Ser. No. 140,287, Apr. 14, 1980, Pat. No. 4,239,504, which is a continuation-in-part of Ser. No. 29,414, Apr. 12, 1979, abandoned.

[51] Int. Cl.[3] .......................... C09K 3/32; C09K 3/00

[52] U.S. Cl. ........................................ 252/60; 252/61; 252/542; 252/544; 252/153; 252/117; 55/5; 110/215; 110/216; 423/226; 423/228; 423/243

[58] Field of Search ................... 252/542, 544, 60, 61, 252/153, 117, 118, 189, 190; 55/55, 5; 423/243, 228, 226; 110/215, 216

[56] References Cited

U.S. PATENT DOCUMENTS

| | | | |
|---|---|---|---|
| 2,045,057 | 9/1934 | Schulze | 423/243 |
| 2,395,509 | 8/1944 | Shaw | 423/243 |
| 3,387,917 | 6/1968 | Waller et al. | 423/226 |
| 3,697,423 | 10/1972 | Sundby | 252/117 |
| 3,856,921 | 12/1974 | Shrier | 423/228 |

*Primary Examiner*—John E. Kittle
*Assistant Examiner*—Hoa Van Le
*Attorney, Agent, or Firm*—Alexander D. Ricci; Bruce E. Peacock

[57] ABSTRACT

Method for enhancing the removal of particles from a particle-laden gas stream utilizing an electrostatic precipitator, which comprises treating the gas with morpholine or derivatives thereof. Treated particles are found to also have desirable flow characteristics. Particularly effective compositions for the purpose comprise a combination of the morpholine, or derivative thereof, with an electrostatic precipitator efficiency enhancer, and in particular an alkanolamine.

6 Claims, No Drawings

ELECTROSTATIC PRECIPITATOR EFFICIENCY ENHANCEMENT

This is a division of Ser. No. 207,173, filed Nov. 17, 1980, now U.S. Pat. No. 4,294,588, which is a continuation-in-part of Ser. No. 140,287, filed Apr. 14, 1980 and now U.S. Pat. No. 4,239,504, which is a continuation-in-part of Ser. No. 029,414, filed Apr. 12, 1979 and now abandoned.

TECHNICAL FIELD

The use of an electrostatic precipitator for removing particles from gas is indeed well known. Typically, this type of device utilizes the corona discharge effect, i.e., the charging of the particles by permitting such to pass through an ionization field established by a plurality of discharge electrodes. The charged particles are then attracted to a grounded collecting electrode plate from which they are removed by vibration or rapping.

This type of precipitator is exemplified in U.S. Pat. Nos. 3,109,720 to Cummings and 3,030,753 to Pennington.

A common problem associated with electrostatic precipitators is maximizing the efficiency of particle removal. For example, in the utility industry, failure to meet particle emission standards may necessitate reduction in power output (derating). Gas conditioning is an important method for accomplishing this goal as described in a book entitled "INDUSTRIAL ELECTROSTATIC PRECIPITATION" by Harry J. White, Addison-Wesley Publishing Company, Inc. (Reading, Mass., 1963), p. 309. This book is incorporated herein by reference to the extent necessary to complete this disclosure.

To improve precipitator operations various chemical additives have been recommended. In this regard reference to U.S. Pat. No. 2,391,879 and applicants' co-pending U.S. application Ser. No. 140,287, can be made, which patent and application are hereby incorporated in this disclosure in their entirety.

These chemical additives are commonly referred to as electrostatic precipitator efficiency enhancers. These additives modify either the surface chemistry of the particles or the electrical characteristics of the flue gas to enhance the efficiency of the electrostatic precipitator. A secondary, but certainly an important and sometimes crucial, aspect of the precipitator operation is the condition of the ash once it has been removed from the gas stream. More specifically, as can be appreciated, because of the enormous amounts of fuel consumed, for example in an electricity producing facility, the amount of fly ash collected is quite sizeable. Consequently, the fly ash clearly should most desirably be in an easily handled state for removal and disposal. Fly ash which bridges in the collection or disposal hoppers, or which forms a solid mass (cementous) obviously does not meet the aforedescribed criteria. In some instances agents, either alone or in conjunction with electrostatic precipitator efficiency enhancers, are used to condition the fly ash so as to avoid the bridging or compaction problems. While some materials are quite effective in increasing the efficiency of electrostatic precipitators, they may, as explained later herein, affect the handleability, removal and disposal of the collected fly ash because they modify the surface characteristics of the fly ash, causing the ash to agglomerate and compact.

Most desirably an agent should affect fly ash collection without any attendant agglomeration or compaction problems.

THE INVENTION

Applicants have discovered that morpholine and its derivative compounds are not only quite effective as electrostatic precipitator efficiency enhancers but also that the use of this family of compounds produces fly ash which does not have the propensity to cause the bridging or handling problems earlier described. Accordingly, this family of compounds may be used either alone or in conjunction with other known electrostatic precipitator enhancers which, although quite effective for this purpose, provide fly ash which is not easily handled or with forms a semi-solid mass in the hoppers. As apparent, added expense is incurred in the removal of this compacted fly ash.

The morpholine family of compounds which is useful for this purpose includes the following compounds. This listing is for illustrative purposes only and it is anticipated that related but undisclosed derivatives would also be effective for this purpose.

Morpholine
4-butyl morpholine
2,2 diethyl-4-butyl morpholine
2,2-dimethyl-4-butyl morpholine
2,6 dimethyl-4-cyclohexyl morpholine
4-cyclohexyl-morpholine
4-cyclopentyl morpholine
2,3 dimethyl morpholine
2,4 dimethyl morpholine
2,5 dimethyl morpholine
2,6-dimethyl morpholine
3,3-dimethyl morpholine
3,4 dimethyl morpholine
3,5 dimethyl morpholine
2-phenyl-3,4-dimethyl morpholine
2-phenyl-3,3-dimethyl morpholine
2-phenyl-5,5-dimethyl morpholine
2,3-diphenyl morpholine
2-ethyl morpholine
3-ethyl morpholine
4-ethyl morpholine
2-methyl-4-phenyl morpholine
2-methyl-3-phenyl morpholine
2-methyl-5-phenyl morpholine
2-methyl-6-phenyl morpholine
4-phenyl morpholine The amount of morpholine and/or its derivatives (hereafter referred to collectively as morpholine) required for effectiveness as an electrostatic precipitator efficiency enhancer (EPEE) and/or as a particle conditioning agent may vary and will, of course, depend on known factors such as the nature of the problem being treated. The amount could be as low as about 1 part of morpholine per million parts of gas being treated (ppm), however, about 5 ppm is a preferred lower limit. Since the systems tested required at least about 20 ppm morpholine, that dosage rate represents the most preferred lower limit. It is believed that the upper limit could be as high as about 200 ppm, with about 100 ppm representing a preferred maximum. Since it is believed that about 75 ppm active morpholine will be the highest dosage most commonly experienced in actual precipitator systems, that represents the most preferred upper limit.

While the treatment could be fed neat, it is preferably fed as an aqueous solution. Any well known feeding system could be used, provided good distribution across the gas stream duct is ensured. For example, a bank of air-atomized spray nozzles upstream of the precipitator proper has proven to be quite effective. Particularly effective results are achieved where the treatment or composition is distributed across the gas stream in near submicron size droplets.

If the gas temperature in the electrostatic precipitator exceeds the decomposition point of a particular morpholine being considered, a higher homolog with a higher decomposition point should be used.

As earlier indicated, morpholine and its derivatives may be used either alone as electrostatic precipitator efficiency enhancers or as particle, and in particular fly ash, conditioning agents or they may be used where desirable for either purpose with other known efficiency enhancers. Exemplary of such other enhancers are those described in U.S. Pat. No. 2,381,879 according to which the efficiency of removal of "acidic" particulates is increased by adding organic amine to the gas, specifically, primary amines such as methylamine, ethylamine, n-propylamine and sec-butylamine; secondary amines such as dimethylamine, diethylamine, dipropylamine and diisobutylamine; tertiary amines such as trimethylamine, triethylamine, tripropylamine and triisobutylamine; polyamines such as ethylenediamine and cyclic amines such as piperidine, or the alkanolamine phosphate esters described in U.S. Pat. No. 4,123,234. Both U.S. Pat. Nos. 2,381,879 and 4,123,234 are incorporated herein by reference.

Most preferably the morpholine and its derivatives are used together with the free base amine alcohols described in the parent application, of which the present application is a continuation-in-part.

The amino alcohols can be categorized as aliphatic, aromatic and cycloaliphatic. Illustrative examples of aliphatic amino alcohols are as follows:

ethanolamine
diethanolamine
triethanolamine
propanolamine
dipropanolamine
tripropanolamine
isopropanolamine
diisopropanolamine
triisopropanolamine
diethylaminoethanol
2-amino-2-methylpropanol-1
1-dimethylaminopropanol-2
2-aminopropanol-1
N-methylethanolamine
dimethylethanolamine
N,N-diisopropylethanolamine
N-aminoethylethanolamine
N-methyldiethanolamine
N-ethyldiethanolamine
N-2-hydroxypropylethylenediamine
N-2-hydroxypropyldiethylenetriamine
aminoethoxyethanol
N-methylaminoethoxyethanol
N-ethylaminoethoxyethanol
1-amino-2-butanol
di-sec-butanolamine
tri-sec-butanolamine
2-butylaminoethanol
dibutylethanolamine 1-amino-2-hydroxypropane
2-amino-1,3-propanediol
aminoethylene glycol
dimethylaminoethylene glycol
methylaminoethylene glycol
aminopropylene glycol
3-aminopropylene glycol
3-methylaminopropylene glycol
3-dimethylaminopropylene glycol
3-amino-2-butanol Illustrative examples of aromatic amino alcohols are as follows:

p-aminophenylethanol
o-aminophenylethanol
phenylethanolamine
phenylethylethanolamine p-aminophenol
p-methylaminophenol
p-dimethylaminophenol
o-aminophenol
p-aminobenzyl alcohol
p-dimethylaminobenzyl alcohol
p-aminoethylphenol
p-dimethylaminoethylphenol
p-dimethylaminoethylbenzyl alcohol
1-phenyl-1,3-dihydroxy-2-aminopropane
1-phenyl-1-hydroxy-2-aminopropane
1-phenyl-1-hydroxy-2-methylaminopropane Illustrative examples of cycloaliphatic amino alcohols are as follows:

cyclohexylaminoethanol
dicyclohexylaminoethanol
4,4'-di(2-hydroxyethylamino)-di-cyclohexylmethane
2-aminocyclohexanol
3-aminocyclohexanol
4-aminocyclohexanol
2-methylaminocyclohexanol
2-ethylaminocyclohexanol
dimethylaminocyclohexanol
diethylaminocyclohexanol
aminocyclopentanol
aminomethylcyclohexanol Of course, the aliphatic and cycloaliphatic amino alcohols can be grouped together under the category alkanolamines.

The amount of free base amino alcohol as well as those described in U.S. Pat. Nos. 2,381,879 and 4,123,234 (enhancers) required for effectiveness as an electrostatic precipitator efficiency enhancer (EPEE) may vary and will, of course, depending on known factors such as the nature of the problem being treated. The amount could be as low as about 1 part of enhancer per million parts of gas being treated (ppm); however, about 5 ppm is a preferred lower limit. It is believed that the upper limit could be as high as about 200 ppm, with about 100 ppm representing a preferred maximum. Since it is believed that about 75 ppm active enhancer will be the highest dosage most commonly experienced in actual precipitator systems, that represents the most preferred upper limit.

Accordingly, the morpholine and its derivatives may be used in conjunction with the described enhancer either in a single composition or each may be fed separately to the gas stream.

The most economical and effective method, of course, is to feed a composition of the morpholine and the free base amino alcohol, for example, as an aqueous solution.

The composition itself can be designed on a weight ratio basis of the components, the amount of each ingredient in the composition will be dependent upon the particular problem experienced in a specific application. For example, the free base amino alcohols, while impressively effective as enhancers in many applications (perhaps more so than morpholine), sometimes give rise to agglomeration, and compaction of the collected fly ash which has led to bridging in the hoppers, thus causing removal problems. These problems may be nonexistent in some applications, minor in others, and more pronounced in others. The amount of morpholine included in the composition is accordingly commensurate with the severity of the problem. Accordingly, the composition may contain on a weight ratio basis from about 1 to 99% of morpholine, its derivatives or mixtures thereof and from about 99 to 1% of the enhancer such as the alkanolamines. A preferred weight ratio of morpholine to enhancer is 1 to 3.

EXAMPLES

A series of tests were conducted to determine the efficacy of morpholine using a pilot electrostatic precipitator system comprised of four sections: (1) a heater section, (2) a particulate feeding section, (3) a precipitator proper and (4) an exhaust section.

The heater section consists of an electric heater in series with an air-aspirated oil burner. It is fitted with several injection ports permitting the addition of a chemical and/or the formulation of synthetic flue gas. Contained within the heater section is a damper used to control the amount of air flow into the system.

Following the heater section is the particulate feeding section which consists of a 10 foot length of insulated duct work leading into the precipitator proper. Fly ash is added to the air stream and enters the flue gas stream after passing through a venturi throat. The fly ash used was obtained from industrial sources.

The precipitator proper consists of two duct-type precipitators, referred to as inlet and outlet fields, placed in series. Particulate collected by the unit is deposited in hoppers located directly below the precipitator fields and is protected from reentrainment by suitably located baffles.

The exhaust section contains a variable speed, induced-draft fan which provides the air flow through the precipitator. Sampling ports are located in the ductwork to allow efficiency determinations to be made by standard stack sampling methods.

Optical density, O.D., is a measure of the amount of light absorbed over a specific distance. Optical density is proportional to particulate concentration, C, and optical path length, L, according to:

$$O.D.=KLC,$$

where K is a constant and is a function of the particle size distribution and other physical properties of the particle.

Since optical density is directly proportional to particulate concentration it may be used to monitor emissions. Accordingly, an optical density monitor located in an exit duct of an electrostatic precipitator would monitor particulate emissions with and without the addition of chemical treatments to the gases. Treatments which increase the efficiency of a unit would result in decreased dust loadings in the exit gas. This would be reflected by a decrease in O.D. To ensure reproducibility of results, particulate size distribution and other particulate properties, such as density and refractive index, should not change significantly with time.

Accordingly, in the tests conducted, a Lear Siegler RM-41 optical density monitor located in the exit ductwork was used to evaluate precipitator collection performance.

The use of the pilot electrostatic precipitator and optical density monitor for evaluating the efficacy of a chemical treatment as an EPEE is illustrated below in Example 1.

EXAMPLE 1

Fly ash produced as the combustion by-product of an approximately 1% sulfur coal was found to have a resistivity of $10^{10}$ ohm-cm at 300° F. Utilizing this ash type and a flue gas similar to that of an industrial utility plant, pilot electrostatic precipitator studies were performed to determine whether or not a gas conditioning agent could enhance the collection efficiency. The results of the trail are presented in Table 2.

TABLE 2

| | Test #1 | Test #2 |
|---|---|---|
| Chemical Feed Rate, ppm | 0 | 20 |
| Inlet Mass Loading, gr/SCF | .5787 | .6144 |
| Outlet Mass Loading, gr/SCF | $.83 \times 10^{-3}$ | $.184 \times 10^{-3}$ |
| % Efficiency | 99.86 | 99.97 |
| Optical Density Baseline | | .0125 |
| Optical Density After Treatment | — | .007 |
| % Reduction in Optical Density | — | 44% |
| Untreated Inlet/Outlet Potentials | 47/48 KV | |
| Treated Inlet/Outlet Potentials | | 48/>150 KV |

As shown in Table 2, the chemical additive at 20 ppm effected an increase in precipitator efficiency of from 99.86 to 99.97%. The enhanced precipitator operation is also reflected by the 44% reduction in optical density.

The fly ash used in this and subsequent studies was characterized by known standard slurry analysis, x-ray fluorescence and optical emission spectra. The results are shown in Table 3.

TABLE 3

| Characterization of Fly Ash Samples | |
|---|---|
| % Sulfur in coal | 1-1.5 |
| Resistivity (ohm-cm) | $2.54 \times 10^{10}$ |
| **Slurry Analysis** | **Designated Constituent (ppm)** |
| Calcium as Ca | 136 |
| Magnesium as Mg | 9.2 |
| Sulfate as $SO_4$ | 171 |
| Chloride as Cl | 6 |
| Total Iron as Fe | <.05 |
| Soluble Zinc as Zn | <.1 |
| Sodium as Na | 5.8 |
| Lithium as Li | 0.5 |
| Equilibrium pH Slurry | 9.9 |
| **Inorganic Analysis** | **Designated Constituent (wt %)** |
| Loss on Ignition | 8 |
| Phosphorus, $P_2O$— | 1 |
| Sulfur as S, $SO_2$, $SO_3$ | 2 |
| Magnesium as MgO | 2 |
| Aluminum as $Al_2O_3$ | 18 |
| Silicon as $SiO_2$ | 47 |
| Calcium as CaO | 3 |
| Iron as $Fe_2O_3$, $Fe_3O_4$ | 19 |
| $K_2O$ | 2 |
| $TiO_2$ | 1 |

The results of tests evaluating the efficacy of morpholine under various conditions are reported in Table 4 in terms of % decrease in optical density (Δ% O.D.).

Gas flow rates in the pilot precipitator are reported as actual cubic feet per minute at 310° F. The $SO_2$ and $SO_3$ reported are the respective amounts contained in the gas in terms of parts per million parts of gas. The $H_2O$ is approximate volume % in the gas. The chemical feedrates are reported as part of active treatment per million parts of gas.

As can be seen from Table 4, morpholine was effective as an electrostatic precipitator efficiency enhancer. While the compound tested was morpholine, it is believed that other cyclic amine ethers as a class would be effective for the purpose. Also, while the test gas contained fly ash and $SO_2$, which are conditions typically found in coal-fired boilers, it is believed that the EPEE according to the present invention would be effective in other gas systems where particulate matter is to be removed by an electrostatic precipitator.

As a result of these tests, morpholine, being the most active compound, is considered to be the most preferred additive.

TABLE 4

Evaluation Of Morpholine As An Electrostatic Precipitator Efficiency Enhancer

| Treatment | Dosage (ppm) | Gas Temp. | Gas Flow Rate (ACFM) | $SO_2$ ppm | $SO_3$ ppm | $H_2O$ % | Δ % Optical Density |
|---|---|---|---|---|---|---|---|
| Mor- | 7 | 310 | 150 | 676 | 2 | 5 | 40 |
| pho- | 20 | 310 | 150 | 676 | 2 | 5 | 36 |
| line | 34 | 310 | 150 | 676 | 2 | 5 | 40 |
| | 139 | 310 | 150 | 676 | 2 | 5 | 38 |
| | 20 | 385 | 150 | 0 | 0 | ~2 | 48 |
| | 40 | 310 | 150 | 676 | 2 | 6 | 26 |
| | 20 | 310 | 150 | 676 | 2 | 7 | 60 |
| | 20 | 310 | 150 | 676 | 2 | 0 | 54 |
| | 20 | 310 | 150 | 676 | 2 | 5 | 60 |
| | 70 | 310 | 150 | 0 | 0 | 7 | 71 |
| | 20 | 380 | 150 | 0 | 0 | 0 | 31 |
| | 20 | 310 | 150 | 0 | 0 | 0 | 30 |
| | 20 | 310 | 150 | 676 | 2 | 5 | 54 |
| | 20 | 310 | 150 | 676 | 2 | 7 | 54 |

Preliminary results of field trials which have been conducted at a utility plant confirm the above-reported EPEE efficacy studies.

Industrial boiler systems commonly include the boiler proper and heat exchanger means to receive hot combustion gas from the boiler. The heat exchanger can be either an economizer, which uses the combustion gas to heat boiler feedwater, or an air preheater, used to heat air fed to the boiler. In either case, the heat exchanger acts to cool the combustion gas.

The most widely used boiler fuels are oil or coal, both of which contain sulfur. Accordingly, the combustion gas can contain sulfur trioxide which reacts with moisture in the combustion gas to produce the very corrosive sulfuric acid. Since the corrosive effects are, indeed, quite evident on metal surfaces in the heat exchanger equipment, cold-end additive treatments are injected into the combustion gas upstream of the economizer or air preheater to reduce corrosion.

If a boiler is coal-fired, electrostatic precipitator equipment is sometimes provided downstream of the heat exchanger to remove fly ash and other particles from the combustion gas. To improve the efficiency of particle collection, electrostatic precipitation efficiency enhancers are typically added to the combustion gas at a location between the heat exchanger means and the precipitator, that is, downstream of the heat exchanger means.

Based on economic and/or efficacy considerations, it may be desirable to blend various morpholine-like compounds for optimization purposes.

It is understood that the morpholine can be fed directly or formed in the gas stream as shown in Table 5.

TABLE 5

Synthesis of Morpholine & Derivatives

Ref: Heterocylic Compounds Vol. 6 R. C. Eldenfield ed, 1957 pages 502–510.
Several different synthetic routes to morpholines are given in the reference.

(1)

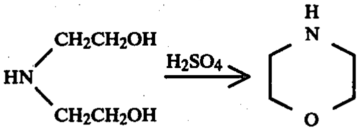

(2)

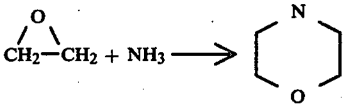

(3)

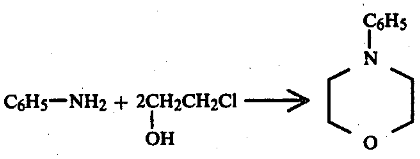

(4)

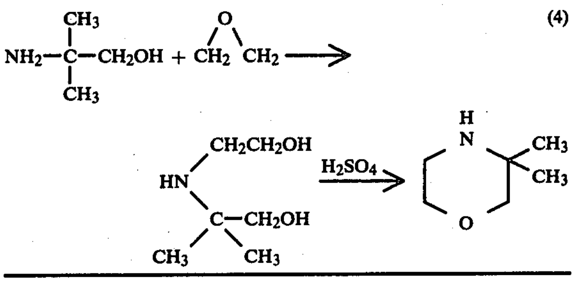

ASH CONDITIONING

Flue gas conditioning is one method by which the collection efficiency of electrostatic precipitator systems can be improved. However, the surface chemistry of the fly ash can be altered by physi- or chemi- sorption of the conditioning agent which may well affect the flow properties of the powdered material.

In order to assess the effect, if any, that gas conditioning agents have on the flow characteristics of fly ash, it is necessary to determine to what extent the powder strength of a bulk powdered solid is enhanced by chemical treatment. To this end, a method was developed which quantitatively determined the relative powder strength, F, developed by a constant consolidating pressure, P, by measuring the torque, T, required to shear the powder through a fixed, but arbitrary angle of rotation.

Fly ash samples, treated in the pilot precipitator with various gas conditioning agents and at various feedrates, were withdrawn from the ash hopper system. The shear torque values of the various samples were then measured. The results are shown in Table 6.

It is clear from the results of Table 6 that inclusion of morpholine lowers the shear torque value and thereby lowers the acquired powder strength. As the concentration of morpholine in the treatment increases, the acquired powder strength is decreased. This is observed at both the 20 and 100 ppm treatment levels.

The fact that morpholine reduced the cohesive strength of fly ash powders was also confirmed by a second experiment in which the force required to crack a dried filter cake of treated ash was determined. As the results in Table 7 show, treatment with morpholine greatly reduces the cohesive strength of the powder.

TABLE 6

Shear Torque Value as a Function of Morpholine Concentration

| Treatment Diethanolamine | % Actives Morpholine | Dosage (ppm) | Shear Torque (Relative Units) |
|---|---|---|---|
| 100 | — | 20 | 150 |
| 75 | 25 | 20 | 138 |
| 50 | 50 | 20 | 120 |
| 25 | 75 | 20 | 114 |
| — | 100 | 20 | 100 |

TABLE 7

Cohesive Strength of Fly Ash Powders Treated With Diethanolamine and Morpholine

| Treatment | Dosage | Cohesive Strength | Δ % |
|---|---|---|---|
| Control | 0 | 52 | — |
| Diethanolamine | 10% (wt/wt) | 190 | — |
| Diethanolamine plus Morpholine | 10%/1% wt/wt | 88 | −54 |
| Control | 0 | 52 | — |
| Morpholine | 1% wt/wt | 27 | −48 |

The two methods which were developed to measure the apparent relative cohesive strength of powders with and without chemical treatments are not designed to yield the absolute magnitude of the various forces responsive for the cohesion of powdered solids. The test methods were designed however, to measure in a relative way, the manner in which chemical treatments appear to affect these forces.

In the first test, the powdered solid was placed in an aqueous medium containing the chemical treatment to be evaluated. After agitating to allow sufficient time for adsorption, the slurry was placed in an inert container and dried at 103° C. for several hours. The dried ash was allowed to cool slowly in a controlled humidity environment.

The surface hardness and cohesivity of the bound solid material (6 cm. in diameter and 1 cm thick) was measured by placing the consolidated solid on one pan and an empty 500 $cm^3$ beaker the other pan (of a double pan balance). The balance was then nulled and fully arrested to allow the positioning of a 3 mm plunger needle. The plunger was lowered to the surface of the ash by means of an externally mounted vernier assembly.

The measurement was begun by releasing the balance and slowly adding weight, in a uniform way, to the balance pan containing the 500 $cm^3$ beaker. In this case, water was added to the beaker from a 50 $cm^3$ buret externally mounted over the beaker.

In adding water to the beaker containing pan, an upward force was applied to the filter cake which was initially resting against the needle tip. As the force was increased, the plunger eventually penetrated and cracked the solid. The penetration was usually quite rapid and definitive. The addition of weight to the beaker pan was stopped when the coagulated solid cracked.

Once the filter cake was broken, the needle plunger was raised and the balance re-zeroed. The weight necessary to re-zero the balance gave the applied force required to penetrate the surface crust.

The significance of the test when applied to the hopper systems of electrostatic precipitations is made clear when it is understood that consolidated fly ash at the throat of the hopper outlet can form stable flow obstructions by bridging and arching across structural support beams if the ash is capable of sustaining the principal stresses involved at the point in question. In general, fly ash is not a free flowing powdered material which means that in many instances fly ash exhibits erratic flow. Typically, erratic flow is characterized by a succession of arches or bridges which first form, fissure, crack, collapse and reform. It is believed that the measurement made in this test assesses, in a relative way, to what extent chemical treatment affects a powder's ability to exhibit erratic flow behavior.

In the second method the manner in which chemical treatments either enhance or retard the ability of a powdered solid to flow over itself is assessed. This is an important aspect of the flow process since it is clear that once the flow of a powder has been initiated, it is sustained by the ability of the powder to flow over itself and the container walls in which it is stored.

The test method consisted of placing a weighed quantity of chemically treated fly ash obtained from the hopper system of the precipitator into a stainless steel beaker and securing the beaker and contents to the base of the test apparatus. It should be noted, that before mounting the powder specimen on the testing stand, the powder contained within the beaker could be heat treated and/or consolidated by applying standard weights to the surface of the ash. After the ash was suitably treated, the sample was raised by means of an externally mounted vernier until a shearing blade (1″×3″) contacted the powder surface. The base platform was then carefully raised until the blade was embedded within the ash sample such that a 1 cm powder layer existed between the top edge of the blade and the powder surface.

The shearing blade was attached by means of a shaft to a device which applied a known torque to the motor shaft. The torque applied was sequentially increased. Each incremental increase in applied torque was maintained for 15 seconds.

The cohesive strength to the powder was determined by the measured torque value required to shear the powder.

Field Trial

A field trial using a 3:1 by weight blend of diethanolamine and morpholine as a 5% active aqueous solution formulation (hereinafter referred to as Product) was conducted on a full sized electrostatic precipitator system in an East Coast steam electric utility plant. The precipitator treated approximately 44% of the total flue gas produced by a 300 mw coal fired boiler unit. The precipitator was a Research Cottrel unit with 4 chambers, 10 power supplies, 20 bus sections and 5 fields. The precipitator is typical of the type of gas cleaning equipment used by utilities.

The opacity of the effluent flue gas was monitored in the exit breeching of the precipitator as well as in the stack itself. Regulatory air pollution control agencies require that effluent stack gas opacity be less than or equal to 20%.

During the course of the field trial several instances which demonstrated the efficacy of the diethanolamine/morpholine blend were observed. The following is typical of the demonstrated efficacy.

In order to complete the pneumatic conveying system of a newly installed silo facility, the dust removal system servicing the precipitator in the facility was shut down. During this interim, the treatment of the precipitator with the Product was terminated. For two weeks prior to this termination, the Product was continually injected into the precipitator system.

As evident from Table A, up to 11:00 a.m. the precipitator opacity level was 15.8% and stable. However, at 11:00 a.m., the treatment rate was reduced. Within 30 minutes, the opacity level increased to 24.2% and continued to increase until 1:00 p.m., at which time treatment was terminated altogether. The untreated equilibrium opacity level was rapidly attained and as shown, settled to 53.2%.

At 6:00 p.m., the precipitator dust removal system was reactivated, as was treatment and the Product. Again, as shown in Table A, in less than 15 minutes, the opacity rapidly dropped from nearly 53.2% to 24.2%. The opacity continued its downward trend and 2 hours later (~8:00 p.m.), the 15.8% opacity level was re-established. By contrast, the opacity of the gas passing through a precipitator receiving no treatment with the Product remained constant throughout the period at levels ranging from 40 and 50%.

Additionally, as shown in Table B, the overall input power (KVA) to the precipitator also responded to changes made in the treatment with the Product during the critical time periods. The initial reduction in treatment with the Product was reflected by a 31% reduction in power. This power reduction trend increased to nearly 57% when treatment with the Product was terminated completely.

However, one hour after re-starting treatment with the Product (~7:00 p.m.), power levels increased by 18% and 3.5 treatment hours later (~9:00 p.m.), power levels increased 27.8%/

TABLE A

| Time | Product Feed | Corrected Exit Stock Opacity |
|---|---|---|
| 10:00 a.m. | Continuous | 15.8 |
| 11:00 a.m. | Reduced | |
| 11:30 a.m. | | 24.2 |
| 1:00 p.m. | Off | |
| 2:00-6:00 p.m. | | 53.2 |
| 6:00 p.m. | On | |
| 6:15 p.m. | | 24.2 |
| 8:00 p.m. | | 15.8 |

TABLE B

Precipitator Input Power Response With Flue Gas Conditioning Treatment With the Product

| Day No. | Time | Treatment Condition Product Feed | Precipitator Percent Change in Total Power Electric Output From | To | % |
|---|---|---|---|---|---|
| 1 | 7:40 a.m. | On | 35,800 | | |
| | 11:00 a.m. | Reduced | | | |
| | 11:10 a.m. | | | 24,795 | −30.7 |
| | 1:00 p.m. | Off | | | |
| | 2:52 p.m. | | | 14,701 | −58.9 |

TABLE B-continued

Precipitator Input Power Response With Flue Gas Conditioning Treatment With the Product

| Day No. | Time | Treatment Condition Product Feed | Precipitator Percent Change in Total Power Electric Output From | To | % |
|---|---|---|---|---|---|
| | 5:00 p.m. | | | 15,870 | −55.7 |
| | 6:00 p.m. | On | | | |
| | 7:05 p.m. | | 15,870 | 18,735 | +18.0 |
| | 9:35 p.m. | | | 20,290 | +27.9 |
| 2 | 7:00 a.m. | | | 45,065 | +183.9 |

Finally, the fact that the diethanolamine/morpholine blend effectively enhanced the flow properties of the bulk powered solid is reflected by the shear torque data listed in Table C. As shown, the torque values associated with the ash samples extracted from the precipitator system and treated with the diethanolamine/morpholine blend are in all cases lower than the corresponding average values observed during the control period.

As a result of the treatment program, the treated precipitator was kept well within the opacity limits required by state and federal regulatory agencies. In addition, no deleterious effects were noted on ash flow quality nor in any of the precipitations' internals or sub-system components which would in any way mitigate the efficacy demonstrated by the diethanolamine/-morpholine blend.

TABLE C

Ash Flow Quality Enhancement Observed During a Recently Completed Field Trial

| Ash Sampling Location | Average Relative Shear Torque[1] Control No Treatment | Chemically Treated Diethanolamine/Morpholine |
|---|---|---|
| Inlet Hopper Section | 126 ± 7.2 | 115 ± 10 |
| Center Hopper Section | 112 ± 13 | 105 ± 4 |
| Outlet Hopper Section | 119 ± 11 | 98 ± 9 |

[1]Shear Torque — On a relative basis, the higher the shear torque value the more difficult it is for the powder to move over itself.

Having thus described our invention, what we claim is:

1. A composition for treating particle-laden gas streams in an electrostatic precipitator system, which comprises (i) a member selected from the group consisting of morpholine, derivatives of morpholine and mixtures thereof, wherein said morpholine and said morpholine derivatives have the basic structure

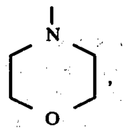

and (ii) a free base amine alcohol electrostatic precipitator efficiency enhancer.

2. A composition according to claim 1, wherein the composition is an aqueous solution.

3. A composition according to claim 1, wherein said enhancer is at least one member selected from the group consisting of monoethanolamine, diethanolamine, triethanolamine, methylethanolamine, N-aminoethylethanolamine and N,N-diethylethanolamine.

4. A composition according to claim 2, wherein the enhancer is diethanolamine.

5. The composition of claim 3, wherein said enhancer is diethanolamine.

6. A composition according to claim 1, 4, or 3, wherein the member is morpholine.

* * * * *